Patented Sept. 15, 1942

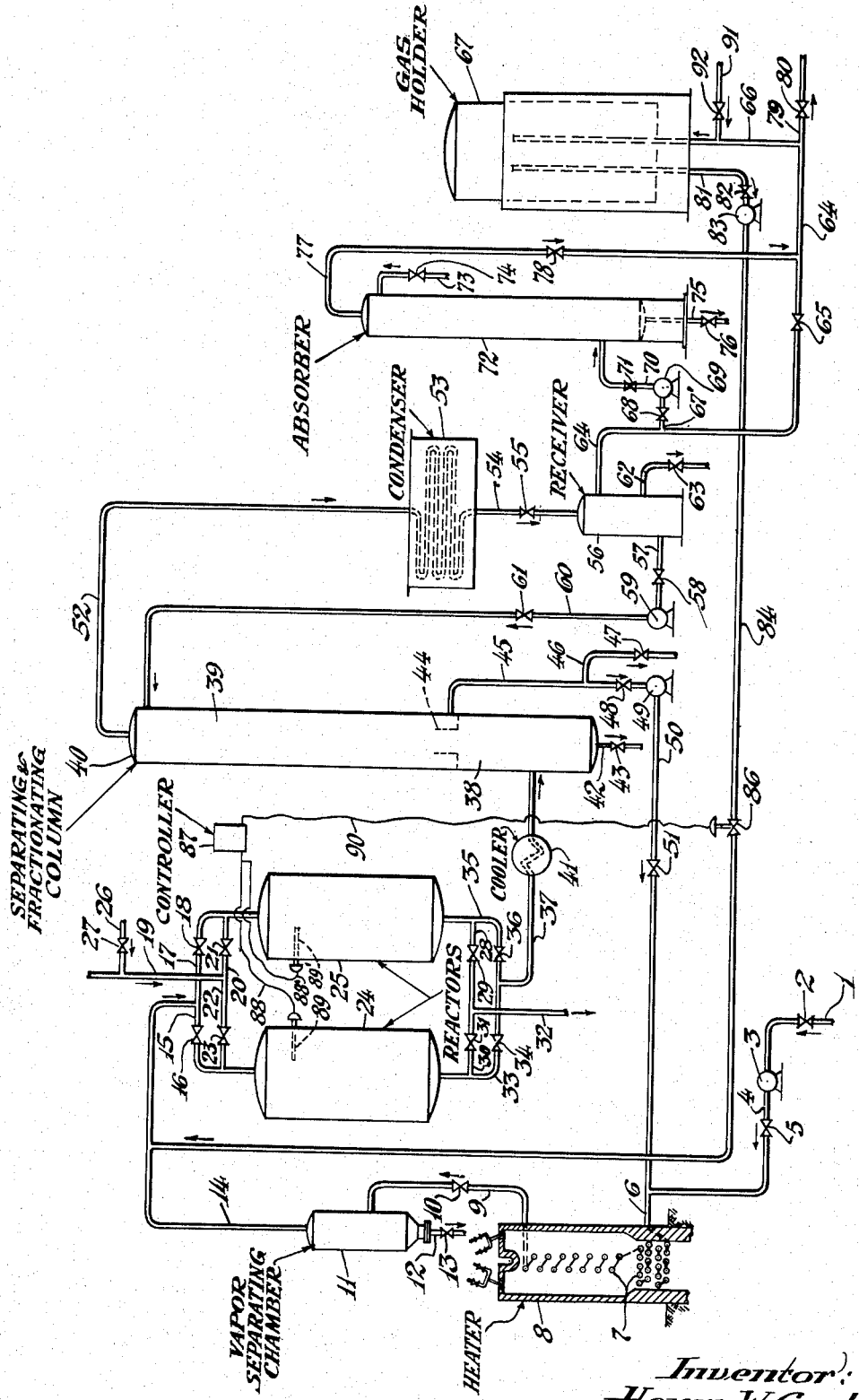

2,295,730

UNITED STATES PATENT OFFICE 2,295,730

CATALYTIC CONVERSION OF HYDRO-CARBONS

Henry W. Grote, Chicago, Ill., assignor to Universal Oil Products Company, Chicago, Ill., a corporation of Delaware Application November 9, 1939, Serial No. 303,607

5 Claims. (Cl. 196—52)

The invention is specifically directed to an improved process for the catalytic conversion of hydrocarbons of the type in which deleterious heavy carbonaceous material deposited on the catalyst during conversion of the hydrocarbons is periodically burned therefrom in a stream of oxygen-containing gases to renew the activity of the catalyst.

In such processes the regenerating step is exothermic and must be conducted within a range of temperatures sufficiently high to insure ignition and progressive combustion of the deposited carbonaceous materials, but sufficiently low to preclude damaging the catalyst. To assist in preventing the development of excessive temperatures in the catalyst bed during regeneration, the regenerating gas stream employed will contain a relatively small percentage of free oxygen and the high percentage of non-oxidizing gas and, due to the dilute nature of the oxidizing medium, the temperature required for initiating and maintaining combustion in the catalyst bed will, with known catalysts which are sufficiently cheap for commercial use, closely approach the maximum permissible temperature. For this reason, at the end of each regenerating period all or a portion of the catalyst bed will be at a temperature which appreciably exceeds the optimum temperature for accomplishing catalytic conversion of the hydrocarbons. As a result of this, an excessively high rate of conversion and carbon deposition will occur for a short time at the beginning of each processing cycle (i. e., until the temperature of the catalyst bed has been reduced to a lower level).

It is common practice to substantially purge the catalyst chamber of oxygen-containing gases following each period of regeneration by passing oxygen-free combustion gases or other non-oxidizing gases therethrough for a short time. This serves to somewhat reduce the temperature of the catalyst bed but, due to the relatively short duration of the purging period, its temperature will not be reduced to within the range of that most desirable for conducting the hydrocarbon conversion reaction. The purge period might be lengthened and/or the temperature of the purging gases reduced to bring the catalyst bed to the desired low temperature level, but this practice would involve other changes in the operation, some of which are difficult to accomplish while others are decidedly undesirable.

To overcome the aforementioned difficulties, the invention provides for supplying essentially non-reactive normally gaseous products of the process to the catalyst chamber in admixture with the hydrocarbons to be converted during the early part of each processing period. This simple expedient serves a two-fold purpose. The non-reactive recycled gases dilute the hydrocarbon reactants and thus decrease the rate of conversion of the latter and, in addition, they increase the total quantity of materials passed through the catalyst bed in a given time, thus giving a higher mass velocity in the catalyst chamber and reducing the contact time between the catalyst and the reactants. By regulating the quantity of non-reactive gases thus recycled in conformity with the temperature of the catalyst bed a more uniform rate and extent of conversion may be maintained throughout the entire processing cycle and, in the preferred embodiment of the invention, the quantity of non-reactive gases recycled to the reactor is progressively diminished as the temperature of the catalyst bed decreases and recycling of the gases may, when desired, be discontinued when this temperature is reduced to the desired value.

It is also within the scope of the invention to recycle some gases during a major portion or all of the processing period and, in such instances, the recycle gases may serve to partially or entirely replace the steam which is ordinarily supplied to the reactor with the hydrocarbons. Steam is used in conventional practice to reduce the effective pressure in the conversion zone and thus minimize thermal conversion of the hydrocarbons and permit the use of higher gauge pressures in the system, substantial superatmospheric pressure being beneficial in assisting separation of normally gaseous and normally liquid products of the process. However, steam has been found detrimental to many catalysts, particularly those ordinarily employed for catalytic cracking, and the use of non-reactive gases in place of steam will be beneficial when such catalysts are employed.

Some or all of the features of the invention are advantageously applicable to a wide variety of catalytically promoted hydrocarbon conversion reactions of the general type in which periodic reactivation of the catalyst is required and in which the reactivation is exothermic. Catalytic cracking, dehydrogenation, isomerization and cyclization are examples of such conversion reactions. In its broader aspects the invention is, therefore, not limited to any specific conversion reaction but only to reactions of this general type.

I have chosen a catalytic cracking operation to more concretely illustrate the features and advantages of the invention and the subsequent description will be directed primarily to a process for the catalytic cracking of hydrocarbon oil.

The accompanying drawing is essentially a flow diagram of a catalytic cracking system embodying the features of the invention.

Referring to the drawing, hydrocarbon oil charging stock for the process is supplied through line 1 and valve 2 to pump 3 by means of which it is fed through line 4, valve 5 and line 6 to heating coil 7 disposed within heater 8. The heater and coil may be of any desired form capable of heating the cracking stock to the desired temperature and, as in the case here illustrated, is preferably of a form employing high rates of heat transfer whereby the oil may be quickly heated to the desired temperature so as to minimize thermal cracking in this zone.

The cracking stock is substantially vaporized in coil 7 or in separating chamber 11, to which the heated materials discharged from the coil are directed through line 9 and valve 10, and chamber 11 serves as a zone wherein deleterious non-vaporized components of the oil supplied to coil 7 are separated from its relatively clean vaporous components which are suitable as catalytic cracking stock. The heavy unvaporized materials are removed from chamber 11 through line 12 and valve 13 to cooling and storage or elsewhere, as desired, and the relatively clean hot vapors which constitute the catalytic cracking stock are directed from chamber 11 through line 14 to reactors 24 and 25, as will be later explained.

Reactors 24 and 25 are substantially identical in form and size and each of the reactors is alternately employed as a zone for conducting the catalytic cracking reaction and as a zone wherein catalyst previously employed to promote the cracking reaction is periodically reactivated. Each of the reactors contains a bed of catalytic material, not illustrated, which, while in active state, is capable of promoting the cracking reaction. Catalytic cracking of the oil vapors and reactivation of the catalyst takes place simultaneously in the two reactors and by alternately employing each reactor for conducting the cracking operation and for reactivating the catalyst, both the cracking and the reactivating operations are made continuous.

While reactor 24 is employed for conducting catalytic cracking of the hydrocarbon vapors, the latter are supplied thereto from line 14 through line 15 and valve 16, while oxygen-containing gases suitable for effecting combustion of the carbonaceous material deposited on the previously used catalyst in reactor 25 are simultaneously supplied thereto in heated state through line 19, line 20 and valve 21.

In the case here illustrated, substantially oxygen-free gases are commingled in line 19 with air supplied thereto through line 26 and valve 27. Either the resulting mixture or the substantially oxygen-free gases prior to their admixture with the air are heated, by well known means, not illustrated, to a temperature at which oxidation of the carbonaceous material on the catalyst particles will be initiated upon contact thereof with the reactivating gas stream. Due to the exothermic nature of the reactivating step, the catalyst bed is heated during reactivation to considerably above the temperature of the incoming reactivating gas stream.

The temperature at which the hydrocarbon vapors are supplied to the reactor in which the catalytic cracking reaction is taking place is sufficient to initiate the cracking reaction upon their contact with the fresh or reactivated catalytic material in this zone, but this temperature is considerably below that to which the catalyst bed has been heated during reactivation.

When reactivation of the catalyst has been completed in reactor 25, this reactor is substantially purged of oxygen-containing gases by closing valve 27 in line 26 and continuing the flow of substantially oxygen-free gases through reactor 25 for a short time. When this purge of reactor 25 is completed, valve 16 in line 15 is closed and the heated vapors are supplied to reactor 25 through line 17 and valve 18, which is now opened. Simultaneously, valve 21 in line 20 is closed and the substantially oxygen-free gases from line 19 are supplied to reactor 24 through line 22 and valve 23, which is opened, for a sufficient length of time to substantially purge this reactor of hydrocarbon vapors, valve 27 in line 26 remaining closed during this purging period. At the end of the purge period in reactor 24, valve 27 is opened to admit regulated quantities of air to line 19 and reactivation of the catalyst in reactor 24 is accomplished.

During reactivation of the catalyst in reactor 25, the spent or partially spent reactivating gases and combustion products resulting from oxidation of the carbonaceous material are directed from this zone through line 28 and valve 29 to line 32 and while reactivation of the catalyst is taking place in reactor 24, the resulting spent or partially spent reactivation gases and combustion products are directed therefrom to line 32 through line 30 and valve 31. The gases may be discharged from the system through line 32, preferably after recovering useful heat therefrom, in any desired well known manner, not illustrated, or they may be, in part, recirculated to the reactor in which reactivation of the catalyst is taking place through suitable equipment, not illustrated, for removing deleterious materials therefrom, readjusting the temperature to the desired value and substantially eliminating free oxygen other than that added by way of line 26 and valve 27.

While the catalytic cracking reaction is taking place in reactor 24, the resulting conversion products are directed therefrom through line 33 and valve 34 to line 37 and while the catalytic cracking operation is taking place in reactor 25 the resulting conversion products are directed therefrom to line 37 through line 35 and valve 36. The conversion products are directed through line 37 to separating zone 38 which, in this instance, comprises the lower portion of separating and fractionating column 40 and preferably a cooler 41, of any desired well known form, is disposed in line 37 to substantially reduce the temperature of the conversion products prior to their introduction into chamber 38. Cooler 41 may, for example, comprise a heat exchanger through which a cooling medium such as hydrocarbon oil charging stock for the process is passed in indirect heat exchange with the hot conversion products to preheat the charging stock or wherein any other desired cooling medium may be utilized, or it may comprise a steam generator or superheater wherein the hot conversion products serve as the heating medium.

Heavy liquid conversion products are separated from vaporous conversion products in chamber 38 and are removed from the lower portion of this zone through line 42 and valve 43 to cooling and storage or elsewhere, as desired. The lighter components of the conversion products, including gasoline, gas and heavier normally liquid fractions suitable for further cracking, pass from chamber 38 through vapor riser 44 to the upper or fractionating section 39 of column 40, wherein their components boiling above the range of the desired gasoline product of the process are condensed as reflux condensate. The reflux condensate is removed from the lower portion of the fractionating section through line 45 and may be removed, all or in part from the system to cooling and storage or elsewhere through line 46 and valve 47 or it may be directed, all or in part, through valve 48 in line 46 to pump 49 and supplied therefrom through line 50 and valve 51 to further treatment in heating coil 7 and the subsequent portions of the system.

It is within the scope of the invention to return regulated quantities of the reflux condensate formed in fractionator 39, with or without prior cooling, to line 37 or to the upper portion of chamber 38 to assist cooling and separation of the vaporous and heavy liquid components of the conversion products or to cool and return a portion of the total reflux condensate or selected fractions thereof to fractionator 40 to serve as a cooling and refluxing medium in this zone. These are well known expedients in the cracking art and since they do not comprise a novel part of the present invention, means for accomplishing the same are not illustrated. It is also within the scope of the invention, when reflux condensate from fractionator 39 is returned to coil 7, to supply all or a portion of the charging stock to the fractionator or to line 37 or directly to chamber 38 by well known means which, for the same reasons above given, are not illustrated in the drawing.

Fractionated vapors of the desired end-boiling point, which preferably consist essentially of gasoline and normally gaseous fractions, are directed from the upper portion of fractionator 39 through line 52 to condensation and cooling in condenser 53 wherefrom the resulting distillate and uncondensed gases are directed through line 54 and valve 55 to collection and separation in receiver 56. Regulated quantities of the distillate collected in receiver 56 may, when desired, be returned through line 57, valve 58, pump 59, line 60 and valve 61 to the upper portion of fractionator 39 to serve as a cooling and refluxing medium in this zone. The remainder of the distillate is directed from receiver 56 through line 62 and valve 63 to storage or to any desired further treatment which will ordinarily include stabilization, accomplished by well known means, not illustrated, for the purpose of reducing the vapor pressure of the distillate to the desired value by liberating therefrom regulated quantities of dissolved gases.

The uncondensed and undissolved gases collected in receiver 56 are removed therefrom through line 64 and may be supplied either through valve 65 and line 66 to gas-holder 67 or they may be directed through line 67 and valve 68 to compressor 69 and supplied therefrom through line 70 and valve 71 to absorber 72.

Ordinarily, the uncondensed gases collected in receiver 56 will contain substantial quantities of desirable high-boiling fractions including readily polymerizable olefins and, in some instances, light normally liquid components such as pentane. Absorber 72 is therefore utilized, when desired, as a means of recovering these desirable high-boiling components from the lighter gases by absorption. A suitable absorber oil is supplied at the desired temperature to the upper portion of the absorber through line 73 and valve 74 and the enriched absorber oil containing dissolved heavy gases is removed from the lower portion of the absorber through line 75 and valve 76 and may, when desired, be subsequently stripped of dissolved gases in any well known manner, not illustrated, so that the desired heavy gases may be separately recovered and the absorber oil cooled and returned to the absorber for further use. The unabsorbed light components of the gases supplied to absorber 72 are removed from the upper portion of this zone through line 77 and valve 78 wherefrom they may be supplied through lines 64 and 66 to gas-holder 67. When desired, regulated quantities of the gases from receiver 56 or from absorber 72, may be removed from the system to separate storage or elsewhere, as desired through line 79 and valve 80 communicating with line 64.

The function of gas-holder 67 is to store a sufficient supply of hydrocarbon gases to serve as a diluent for the vaporous hydrocarbon cracking stock supplied to the reactors, whereby to control conversion of the hydrocarbon vapors in the manner previously explained. Gases from gas-holder 67 are directed through line 81 and valve 82 to compressor 83 wherefrom they are supplied through line 84, in quantities regulated by valve 86 in this line, to line 14 and therein commingle with the stream of heated vaporous hydrocarbons passing from chamber 11 to the reactor in which the catalytic cracking reaction is taking place.

Preferably, the rate at which the gases are supplied to line 14 and thence to the reactor in which the cracking operation is being conducted is varied during each cracking cycle in each reactor in such a manner as to correlate the diluting effect of the gases and the increased mass velocity which their return effects in the reactors with the varying temperature of the catalyst bed so that a substantially uniform rate of cracking is maintained throughout each operating cycle, thereby preventing excessive cracking and high coke deposition at the beginning of the cycle while the catalyst bed is at an excessively high temperature. This correlation may be accomplished, when desired, to a sufficient degree of accuracy by means of a controller indicated at 87 which communicates through lines 88 and 88' with temperature sensitive devices such as thermocouples 89 and 89' extending into the catalyst beds in the respective reactors 24 and 25, preferably near the top of the beds. Thermocouple 89 is rendered ineffective by means of a suitable switch or the like, not illustrated, while the catalyst bed in reactor 24 is being reactivated and thermocouple 89' is similarly rendered ineffective when the catalyst bed in reactor 25 is being reactivated, so that impulses are transmitted to the controller only from the thermocouple serving the reactor in which catalytic cracking is taking place. These impulses are magnified by controller 87 and transmitted therefrom through line 90 to valve 86 in line 84, which responds to diminish the flow of gases therethrough as the temperature in the catalyst bed wherein cracking is taking place is reduced. Similar control may be effected, when desired, by placing valve 86 at a different point in the system such as, for example, in a steam line supplying steam for motivation to compressor 83, whereby the speed and discharge rate of the compressor may be varied in response to the temperature of the catalyst in which the cracking reaction is taking place.

It is also within the scope of the invention to supply gases directly from receiver 56 or from absorber 72 to the reactor in which the cracking reaction is taking place when sufficient gases are continuously produced within the system that storage, such as provided by gas-holder 67, is not required. This may be accomplished by connecting discharge line 70 from compressor 69 with line 84 or connecting line 77 from absorber 72 with line 84 by suitable valved conduits, not illustrated. When absorber 72 is utilized it may be operated, when desired, at a sufficiently higher pressure than that employed in the reactors to effect the return of gases to the latter without the use of a pump or compressor other than compressor 69 and, in such instances, when gas-holder 67 is required, it may also be operated at a sufficiently higher pressure than that employed in the reactors so that compressor 83 may be eliminated.

Preferably, the hydrocarbon gases employed, as above described, in the reactors are of such a nature that they will not be converted under the conditions maintained in the reactor to which they are supplied or at least will not adversely affect the cracking reaction accomplished in this zone. In some instances, it may be desirable to substantially eliminate hydrogen from the gases and this may be readily accomplished by fractionation of the gases in any well known manner not illustrated. The use of absorber 72 will serve to substantially eliminate readily polymerizable olefins and corresponding heavy paraffins from the gases when this is desired such as, for example, when the cracking catalyst employed will serve to actively promote excessive polymerization of materials such as butenes and propenes. The term "non-reactive" gases, as used in the specification and claims, is intended to define gases which will not adversely affect the cracking reaction.

It is within the scope of the invention to utilize hydrocarbon gases from an external source for the purpose and in the manner above described, either alone or in admixture with gases produced within the system, and as one means of accomplishing this, gases from any suitable external source may be supplied to gas-holder 67 through line 91, valve 92 and line 66.

As an example of one specific operation of the process as conducted in an apparatus such as illustrated and above described, the charging oil is a paraffin distillate of approximately 29° A. P. I. gravity derived from Mid-Continent crude. In this particular operation only the charging oil is passed through coil 7, reflux condensate from fractionator 39 being removed from the system. The temperature of the hydrocarbon vapors entering the reactor in which catalytic cracking is taking place is approximately 975° F. and a superatmospheric pressure of about 50 pounds per square inch is employed at this point in the system with a superatmospheric pressure of about 35 pounds per square inch in the separating and fractionating column and succeeding condensing and collecting equipment. The average temperature of the catalyst after reactivation and purging is approximately 1150° F. and at the start of the cracking period in each reactor gaseous hydrocarbons recovered from the absorption step, which are substantially devoid of 4-carbon atom fractions, are commingled with the stream of hydrocarbon fractions entering the reactor in quantities regulated to give a mass velocity of approximately 0.4 pound per square foot per second in the reactor as compared with the mass velocity of 0.3 which would prevail without recycling of the gases. As the operation progresses and the temperature of the catalyst bed decreases, the quantity of gases recycled is gradually diminished until the average temperature of the catalyst bed reaches approximately 925° F. and the mass velocity in the reactor is approximately 0.30. At this point in the operation the stream of hydrocarbon vapors and added gases is diverted to the other reactor wherein the aforedescribed operation is repeated while the first named reactor is substantially purged of hydrocarbon vapors and gases and the catalyst therein then reactivated. Each operating cycle is of approximately 90 minutes duration and the gasoline produced amounts to approximately 30% by volume of the charging oil, has an end-boiling point of approximately 410° F. and an octane number, as determined by the motor method, of approximately 80. The quantity of heavy carbonaceous material deposited on the catalyst amounts to approximately 1.5% by weight of the charging oil converted. The catalyst employed in this operation consists of preformed granules of substantially uniform size and shape consisting essentially of silica, alumina and zirconia in proportions of approximately 100 mols of silica, 2 mols of alumina and 5 mols of zirconia.

I claim as my invention:

1. In a catalytic conversion process wherein a stream of hydrocarbons to be converted is passed through a mass of active catalytic material in a zone wherein said conversion is effected and wherein carbonaceous deposits resulting from said conversion are periodically burned from the catalyst to reactivate the same while the flow of said hydrocarbons through said mass is discontinued, said burning leaving the thus reactivated catalyst mass, which is brought into renewed contact with said stream of hydrocarbons, at a temperature in excess of the optimum for effecting said conversion, the improvement which comprises commingling non-reactive hydrocarbon gases with the hydrocarbons undergoing said conversion, and decreasing the quantity of said gases thus commingled with said hydrocarbons as the temperature of the reactivated catalyst mass decreases and at a rate such as to maintain a substantially uniform rate of conversion throughout the processing period.

2. In a catalytic conversion process wherein a stream of hydrocarbons to be converted is passed through a mass of active catalytic material in a zone wherein said conversion is effected and wherein carbonaceous deposits resulting from said conversion are periodically burned from the catalyst to reactivate the same while the flow of said hydrocarbons through said mass is discontinued, said burning leaving the thus reactivated catalyst mass, which is brought into renewed contact with said stream of hydrocarbons, at a temperature in excess of the optimum for effecting said conversion, the improvement which comprises commingling non-reactive hydrocarbon gases with the hydrocarbons undergoing said conversion, and maintaining a substantially uniform rate of conversion throughout the processing period by decreasing the quantity of said gases thus commingled with the hydrocarbons in response and in direct relation to the decreasing temperature of the reactivated catalyst mass as the conversion reaction progresses.

3. In a catalytic cracking process wherein a stream of heated, essentially vaporous hydrocarbons is passed through a mass of active catalytic material in a zone wherein the cracking reaction is conducted and wherein said catalyst is periodically reactivated by burning therefrom carbonaceous materials deposited thereon during the cracking operation, said reactivation being accomplished while the flow of said hydrocarbons through said catalyst mass is discontinued and the flow of said stream of hydrocarbons through the thus reactivated catalyst mass being subsequently renewed while said mass is at a temperature in excess of the optimum for effecting said cracking reaction, the improvement which comprises commingling substantially non-reactive hydrocarbon gases with said stream of hydrocarbon vapors, prior to their passage through said reaction zone in contact with the reactivated catalyst mass, in quantities regulated to decrease the cracking of said hydrocarbons which would take place in the absence of said gases, and reducing the quantity of said gases commingled with said stream of hydrocarbons as the cracking operation progresses and the temperature of the catalyst mass is decreased, the quantity of said gases being reduced at a rate such as to maintain a substantially uniform rate of cracking during the operation.

4. In a catalytic cracking process wherein a stream of essentially vaporous heated hydrocarbons is passed through a mass of active catalytic material in a zone wherein the cracking reaction is conducted and wherein said catalyst is periodically reactivated by burning therefrom carbonaceous materials deposited thereon during the cracking operation, said reactivation being accomplished while the flow of said hydrocarbons through said catalyst mass is discontinued and the flow of said stream of hydrocarbons through the thus reactivated catalyst mass being subsequently renewed while said mass is at a temperature in excess of the optimum for effecting said cracking reaction, the improvement which comprises commingling hydrocarbon gases derived from within the system with said stream of hydrocarbon vapors, prior to their passage through said reaction zone in contact with the reactivated catalyst mass, in quantities regulated to decrease the cracking of said hydrocarbons which would take place in the absence of said gases, and reducing the quantity of said gases commingled with said stream of hydrocarbons as the cracking operation progresses and the temperature of the catalyst mass is decreased, the quantity of said gases being reduced at a rate such as to maintain a substantially uniform rate of cracking during the operation.

5. The process defined in claim 4, wherein said normally gaseous hydrocarbons are substantially freed of readily polymerizable olefins prior to said commingling thereof with the hydrocarbon vapors.

HENRY W. GROTE.